United States Patent [19]

Curtis

[11] Patent Number: 4,915,264

[45] Date of Patent: Apr. 10, 1990

[54] PORTION CONTROL APPARATUS

[76] Inventor: David C. Curtis, Box 2801 RFD, Long Grove, Ill. 60047

[21] Appl. No.: 316,546

[22] Filed: Feb. 24, 1989

Related U.S. Application Data

[63] Continuation of Ser. No. 152,802, Feb. 5, 1988, abandoned.

[51] Int. Cl.$^4$ ............................................. G01F 11/06
[52] U.S. Cl. ..................................... 222/250; 222/309
[58] Field of Search .............. 222/134, 249, 250, 308, 222/309, 333

[56] References Cited

U.S. PATENT DOCUMENTS

| | | | |
|---|---|---|---|
| 886,720 | 5/1908 | McCloskey et al. | 222/309 |
| 1,003,256 | 9/1911 | Hardy | 222/250 |
| 1,699,494 | 1/1929 | Schmidt | 222/250 |
| 2,313,067 | 2/1943 | Bates | 222/309 |
| 3,565,298 | 2/1971 | Ohlin | 222/309 |
| 3,737,073 | 6/1973 | Lupert | 222/250 |
| 4,084,729 | 4/1978 | Epple | 222/309 |

Primary Examiner—Joseph J. Rolla
Assistant Examiner—Steven Rein
Attorney, Agent, or Firm—Olson & Hierl

[57] ABSTRACT

A portion control apparatus is provided for receiving a food product and discharging the product in portions of predetermined size. This apparatus has a housing with an inlet, an outlet, a first and second chamber and a passageway connecting the inlet, outlet and chambers. The apparatus also includes a valve disposed in the passageway and movable between a first and second position. In the first position, the valve allows communication between the inlet and the first chamber and between the outlet and the second chamber. In the second position, the valve allows communication between the inlet and the second chamber and between the outlet and the first chamber. Two pistons mounted in the housing for reciprocating movement and connected by a rod limit the amount of food product which each chamber receives and move the product out of each chamber and out of the apparatus through the outlet in an orderly sequence.

3 Claims, 2 Drawing Sheets

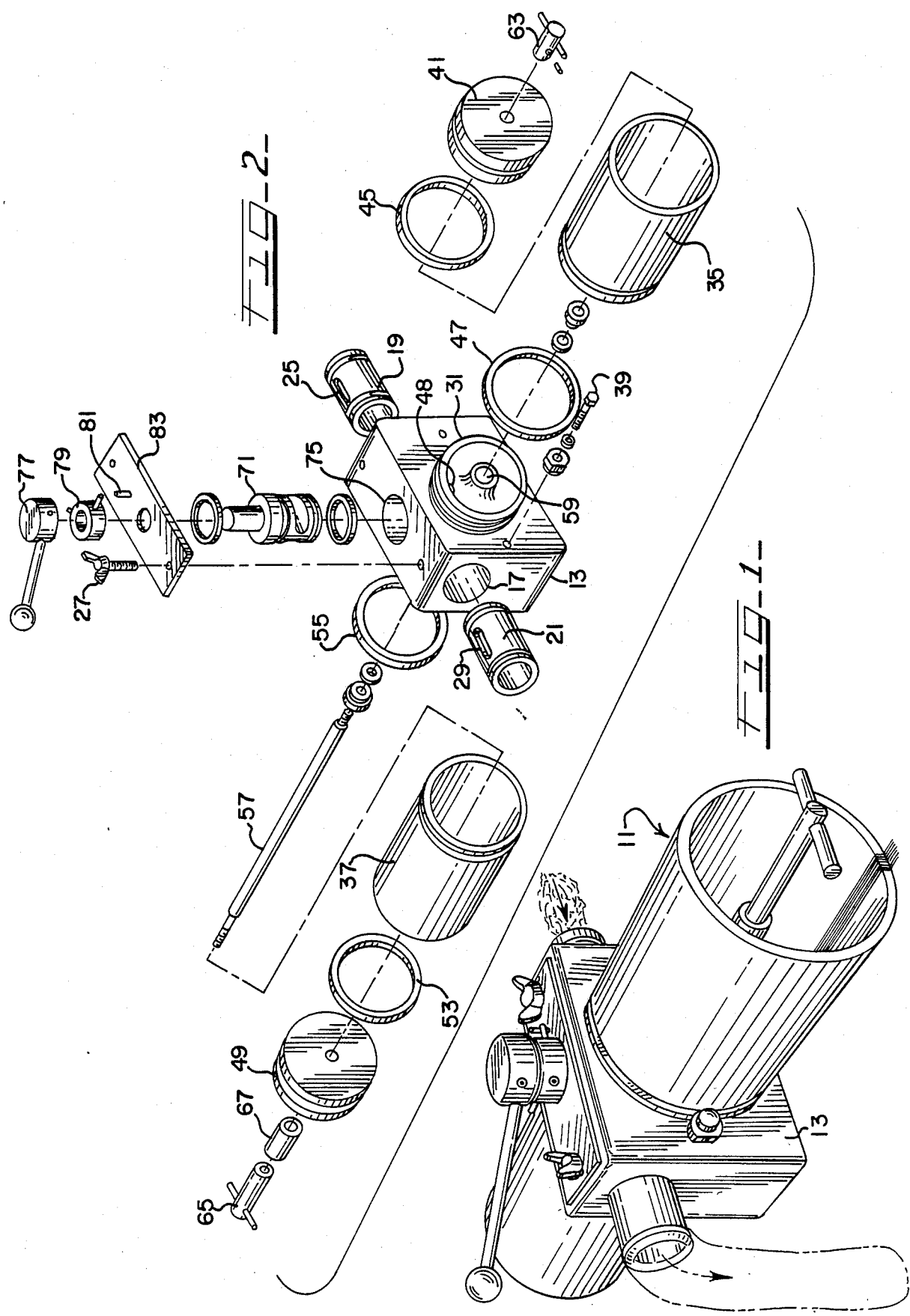

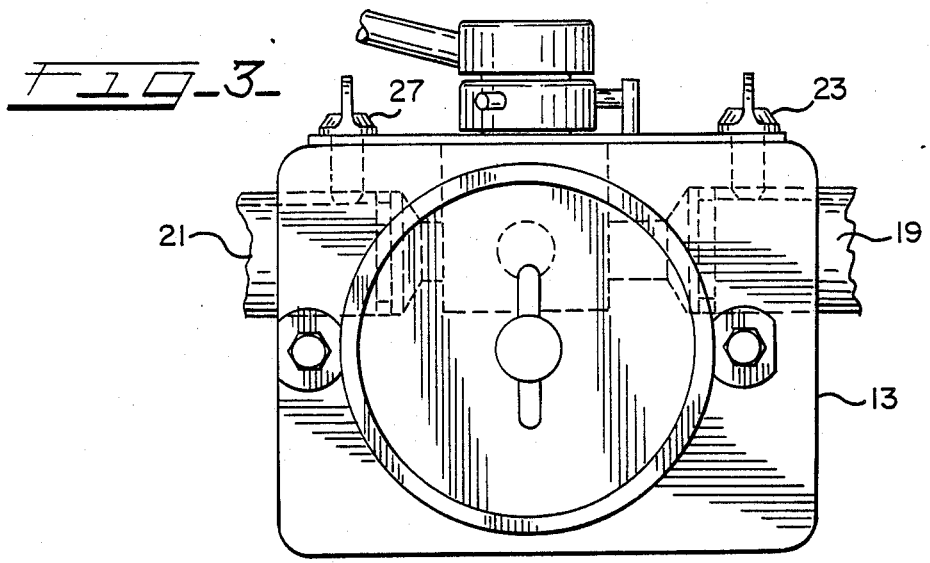
FIG_3
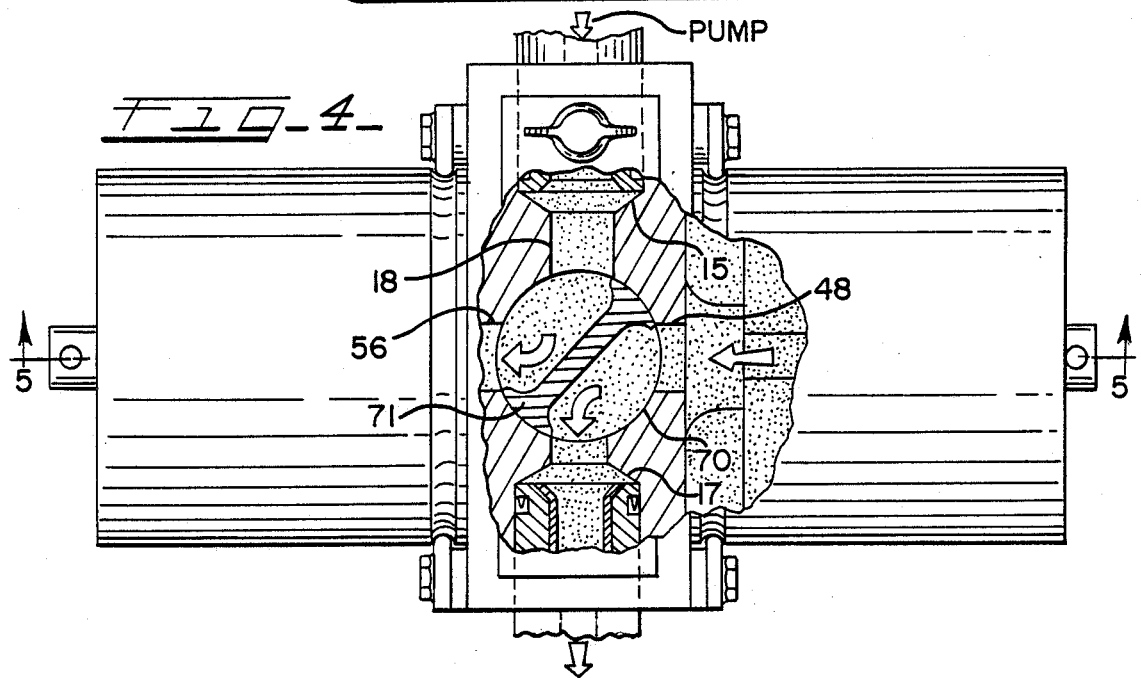
FIG_4
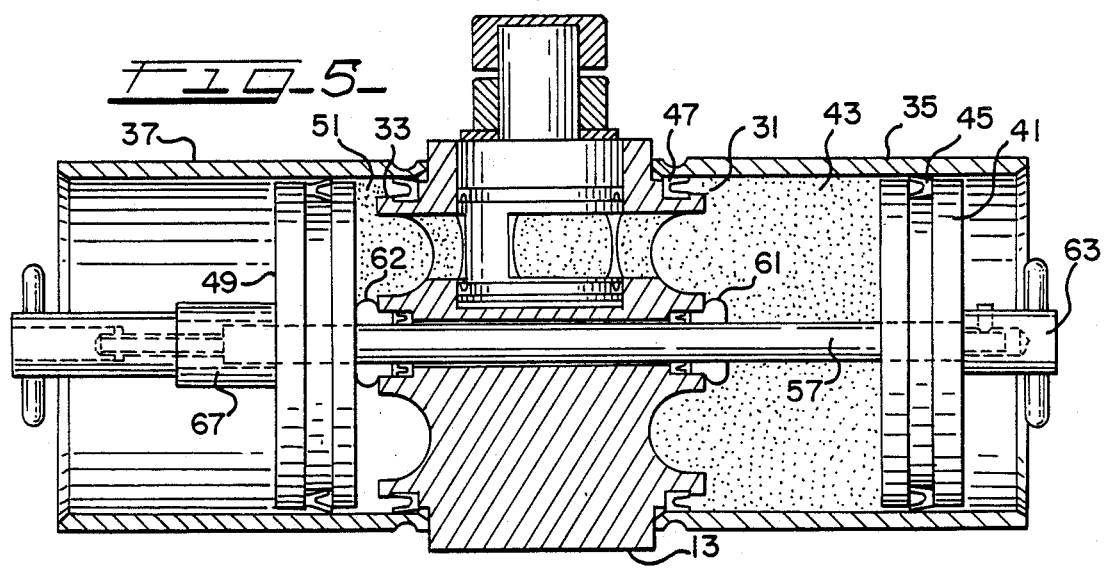
FIG_5

PORTION CONTROL APPARATUS

This application is a continuation application of Ser. No. 152,802, filed Feb. 5, 1988, now abandoned.

BACKGROUND OF THE INVENTION

1. Field of the Invention

The present invention relates generally to food processing apparatus and, more specifically, to an apparatus for receiving a food product, typically processed meat, and discharging the product in portions of predetermined size.

2. Description of the Prior Art

Many food processing procedures require the use of apparatus which controls the amount of food product used in the various steps of the procedure. These apparatus should include a number of desirable features. As an initial consideration, the apparatus should have a simple and reliable construction. Second, the apparatus should require a minimal amount of manual manipulation and avoid complex pneumatic, hydraulic or electric components. Finally, the apparatus should allow quick and easy adjustments so that an operator may vary the amount of food product provided by the apparatus.

The portion control apparatus of the present invention provides a construction which minimizes the expense of manufacture and assembly and gives precise, uniform and reliable performance. It provides predetermined portions of processed food and it allows the user to quickly and easily vary the size of the portion, i.e., the output of the apparatus.

SUMMARY OF THE INVENTION

It is a general object of the present invention to provide an improved portion control food processing apparatus. Specifically, it is an object of this invention to provide a portion control apparatus which receives a food product and discharges the product in portions of predetermined size and which allows quick and easy adjustment so that a user may vary the size of the portion.

It is another object of the present invention to provide a portion control apparatus which minimizes the expense of manufacture and assembly and gives precise, uniform and reliable performance.

Other objects, advantages and features of the present invention will become apparent upon reading the following detailed description and appended claims and upon reference to the accompanying drawings.

In accordance with one embodiment of the present invention, a portion control apparatus which achieves the foregoing objects includes a main block member defining an inlet opening through which the apparatus receives processed food product, e.g., processed meat, an outlet opening through which the apparatus discharges the food product, and a passageway through which the food product moves in the main block member. A pump or other advancing device provides the force to move the food product into and through the portion control apparatus.

A first cylinder or tube having one end releasably secured to the main block member receives a first piston which lies in the cylinder in sliding engagement with the cylinder's inner surface. This first piston closes a first food product measuring chamber defined by the first cylinder and the main block member. This first chamber communicates with the passageway in the main block member through a first opening in the main block member.

Similarly, a second cylinder or tube having one end releasably secured to the main block member receives a second piston. This second piston lies in the second cylinder in sliding engagement with the second cylinder's inner surface. It closes a second product measuring chamber defined by the second tube and the main block member. This second chamber communicates with the passageway in the main block member through a second opening in the main block member.

The first and second pistons move reciprocally (as described below) along the lengths of the corresponding cylinders to allow the first and second chambers to receive a predetermined amount of food product and to move the food product out of the chambers.

A connecting rod, which extends through a third opening in the main block member, also extends through openings at the center of the first and second pistons. It has threaded ends and connects the two pistons together. Two cap nuts attached to the opposite threaded ends of the rod act as stops for the corresponding pistons and prevent the pistons from moving outward of the main block member beyond a predetermined distance. Thus, these nuts determine the size of the chambers. The user can vary the size of the chambers by using spacers to vary the distance between the pistons.

The portion control apparatus includes a valve which lies in the passageway in the main block member to regulate the flow of the food product. The valve includes a segment which extends out of the main block member through a fourth opening in the main block member. A handle and stop arrangement secured to this segment allows the user to manipulate the valve and place it in a first and a second position.

In operation, the apparatus receives food product through the inlet opening; and the food product moves into the block member and to the valve. In the first position, the valve allows communication between the inlet and the first chamber and between the outlet and the second chamber. Thus, in the first position, the valve allows the food product to flow into the first chamber through the first opening in the main block member. As the food product fills the first chamber, it forces the first piston outward. The first piston continues to move outward and the first chamber continues to increase in size until the second piston engages the main block member and prevents the first piston from advancing further. At this point, the user moves the valve to the second position.

In the second position, the valve allows communication between the inlet and the second chamber and between the outlet and the first chamber. As the food product enters the second chamber and fills this chamber, it moves the second piston outward. The connecting rod transmits the force acting upon the second piston to the first piston, forcing the first piston to move inward, i.e., towards the main block member. By moving inward, the first piston forces the food product out of the first chamber, through the first opening, the passageway and the outlet, and into a container, e.g., a sausage casing. The user may then repeat this procedure.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a perspective view of a preferred embodiment of the portion control apparatus of the present invention.

FIG. 2 is an exploded perspective view of the portion control device.

FIG. 3 is a side elevational view of the portion control apparatus of the present invention, showing the inlet and outlet tubes of the portion control apparatus in place in the main block member.

FIG. 4 is a top plan view of the portion control apparatus with a portion of the apparatus cut away to show the internal passageway defined by the main block member of the device.

FIG. 5 is a sectional view taken along line 5—5 of FIG. 4.

While the drawings and the text describe the invention in connection with a preferred embodiment, one will understand, of course, that the invention is not limited to this embodiment. Furthermore, one should understand that the drawings are not necessarily to scale.

DETAILED DESCRIPTION OF THE DRAWINGS AND THE PREFERRED EMBODIMENT

Turning now to the drawings, FIG. 1 shows the preferred embodiment of a portion control apparatus generally at 11. The apparatus 11 includes a main block member 13 comprising a generally rectangular block cast out of metal or any other suitble material and defining an inlet 15 (See FIG. 4), an outlet 17 (See FIG. 2) and a passageway 18 (See FIG. 4). A pump or other similar device moves food product into and through the apparatus 11.

The inlet 15 and the outlet 17 receive tubes 19 and 21, respectively. A screw 23 cooperates with a groove 25 in the tube 19 to lock the tube in the inlet opening. Similarly, a screw 27 cooperates with a groove 29 in the tube 21 to lock the outlet tube in the outlet opening 17 (See FIG. 3). The tube 19 facilitates connection with a food product source (not shown) while the tube 21 facilitates connection with a food product receiving container, e.g., a sausage casing.

The main block member 13 also includes a first annular collar 31 disposed on one side and a second annular collar 33 disposed on the opposite side, concentrically with the first collar 31. These collars 31 and 33 receive round cylinders or tubes 35 and 37, respectively. To releasably secure one end of each tube 35 and 37 around the collar 31 and 33, respectively, the apparatus 11 uses at least one lock assembly 39 for each tube. In the preferred embodiment two assemblies 39 secure each tube to the main block member (See FIG. 4). Each assembly 39 includes a washer-like cam member which co-acts with a groove at one end of each tube and a screw which secures the cam member and tube to the main block member.

The tube 35 receives a piston 41 which lies inside the tube 35 in sliding engagement with the inner surface of the tube (See FIG. 5). This piston 41 closes a first chamber 43 defined by the tube 35 and the main block member 13. An O-ring 45 provides a seal between the piston 41 and the inner surface of the tube 35; and an O-ring 47 provides a seal between the tube 35 and the first collar 31. The chamber 43 communicates with the passageway 18 through a first opening 48 in the main block member 13, located within the collar 31 of the member 13 (see FIG. 4).

Similarly, the tube 37 receives a piston 49 which lies inside the tube 37 in sliding engagement with the inner surface of the tube. This piston closes a second chamber 51 defined by the tube 37 and the main block member 13. An O-ring 53 provides a seal between the piston 49 and the tube 37; and an O-ring 55 provides a seal between the tube 37 and the collar 33. The chamber 51 communicates with the passageway 18 through a second opening 56 in the main block member 13, located within the collar 33 of the member 13 (see FIG. 4).

To connect the two pistons 41 and 49 together so that they may operate in the manner described below, the apparatus 11 includes a piston connecting rod 57 which extends through a third opening 59 in the main block member 13. Its longitudinal axis is co-linear with the longitudinal axes of the tubes 35 and 37. The opening 59 has a diameter greater than the diameter of the rod 57 to allow free axial movement of the rod 57 with minimal transverse or lateral movement. To further minimize the lateral movement of the rod and thus reduce any "chatter", the apparatus 11 includes two flexible rod retainers 61 and 62 releasably secured to the main block member 13 at opposite ends of the opening 59.

The piston connecting rod 57 also extends through an opening in the center of each of the pistons 41 and 49; and cap nuts 63 and 65 disposed at opposite ends of the rod 57 maintain the pistons 41 and 49 on the rod 57. The rod 57 has threaded end segments to receive the nuts 63 and 65.

The maximum distance between the pistons, i.e., the distance between them when they abut against the cap nuts determines the volume of each chamber 43 and 51. In addition, the volume of the chamber 43 when the pistons lie in the positions shown in FIG. 5 equals the volume of the chamber 51 when the pistons shift as far to the left as they can. Using only the cap nuts as stops, the user obtains the maximum volume for each chamber 43 and 51 and accordingly, the maximum output for the apparatus.

To reduce the maximum distance between the pistons 41 and 49, the apparatus 11 includes a spacer tube 67 disposed in sliding relation around the rod 57 between the nut 65 and the piston 49. This spacer 67 reduces the distance that each piston can move outward of the main block member 13 and consequently the maximum volume of the chambers 43 and 51 and the output of the apparatus 11.

The user of the apparatus 11 may vary the maximum distance between the pistons 41 and 49 by changing the spacer 67 with a spacer having a greater or shorter length. In addition, the user may use more than one spacer and may place the spacers on either end of the piston rod 57 or may shorten or lengthen the distance between pistons 41 and 49 by threadedly adjusting nut 65. These spacers effectively control the size of chambers 43 and 51 and, accordingly, allow the user to quickly and easily change the output of the apparatus 11.

The passageways 18 of the main block member 13 includes an annular chamber 70 which communicates with the first chamber 43 through the first opening 48 and with the second chamber 51 through the second opening 56. This chamber 70 also receives a valve 71 rotatably mounted in the chamber 70 to direct the flow of the food product.

The valve 71 is an elongate annular member with a bottom segment having two transverse flow channels formed into opposite sides. The valve 71 also includes a top member which extends out of the main block member 13 through an opening 75. A handle 77 allows the user to rotate the valve; and a stop collar 79 which co-acts with a stop 81 limits the rotation of the valve 71 between a first and second position. The stop 81 is part of a cover plate 83 secured to the top of the main block member 13.

In the first position, the valve 71 lies 90 degrees counterclockwise from the position shown in FIG. 4. In this position, the valve member allows communication between the inlet 15 and the chamber 43 and the outlet 17 and chamber 51. In the second position, shown in FIG. 4, the valve 71 allows communication between the inlet 15 and the chamber 51 and the outlet 17 and the chamber 43.

In operation, the user places the valve 71 in the first position. The apparatus 11 receives food product through the inlet 15, and a pump or other advancing means advances the food product into the chamber 70 of the main block member 13. In the first position, the valve 71 allows the food product to flow from the inlet 15 through the passageway 18 and into the first chamber 43 through the first opening 48 in the main block member 13. As the food product fills the first chamber 43, it forces the first piston 41 outward, increasing the size of the first chamber until the second piston 49 engages the main block member 13 and prevents the first piston 41 from advancing further. At this point, the user moves the valve 71 to the second position.

When the valve lies in the second position, the food product enters the second chamber 51 through opening 18 and fills it, forcing the second piston 49 outward. As the second piston 49 moves outward, it pulls the pistons 41 inward, i.e., towards the main block member 13. In moving inward, the first piston 41 moves the food product out of the first chamber 43, through the first opening 48, and the outlet 17 and into a container, e.g., a sausage casing. To empty the second chamber and fill the first, the user then places the valve in the first position. He or she may repeat this procedure depending on the number of portions desired.

Thus, the applicant has provided a portion control apparatus which attains the objects outlined above. While the applicant has shown only one embodiment of the invention, one will understand, of course, that the invention is not limited to this embodiment since those skilled in the art to which the invention pertains may make modifications and other embodiments of the principles of this invention, particularly upon considering the foregoing teachings. The applicant, therefore, by the appended claims intends to cover any such modifications and other embodiments as incorporate those features which constitute the essential features of this invention.

What is claimed is:

1. A portion control apparatus for receiving a food product and discharging the product in separate portions of predetermined size, said apparatus comprising: a main body member including a four-way valve, first and second food product receiving chambers joined to each side of the main body member, reciprocating means in each food product receiving chamber joined by a rod which slides in a bore in the main body member, the main body member also defining an inlet and outlet and a passageway connecting said inlet, outlet and first and second chambers; the four-way valve means disposed in said passageway and movable between a first and a second position for controlling communication between said first and second chamber and said inlet and outlet, said valve means allowing food product to flow from said inlet to said first chamber and from said second chamber to said outlet when disposed in a first position, and allowing food product to flow from said inlet to said second chamber and from said first chamber to said outlet when disposed in a second position; and reciprocating means for limiting the amount of food product said first and second chambers receive and for moving said food product from said first and second chamber, said reciprocating means moving said food product out of said second chamber and through said outlet as said first chamber fills with food product and moving said food product out of said first chamber and through said outlet as said second chamber fills with food product.

2. The portion control apparatus of claim 1, wherein said body member includes a main block member and wherein said first and second food product receiving chambers further comprise two cylinders secured to said main block member on opposite sides of said main block member.

3. The portion control apparatus of claim 1, wherein said reciprocating means includes a first and second piston.

* * * * *